June 12, 1962 A. E. ROBERTSON ET AL 3,038,407
DRAG OPERATED PARACHUTE RELEASE MECHANISM
Filed July 2, 1951 2 Sheets-Sheet 1
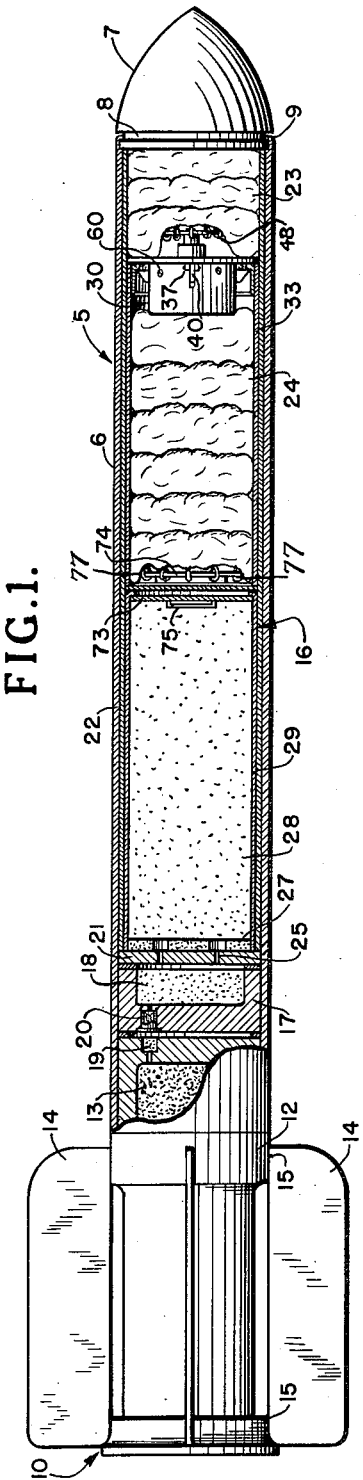
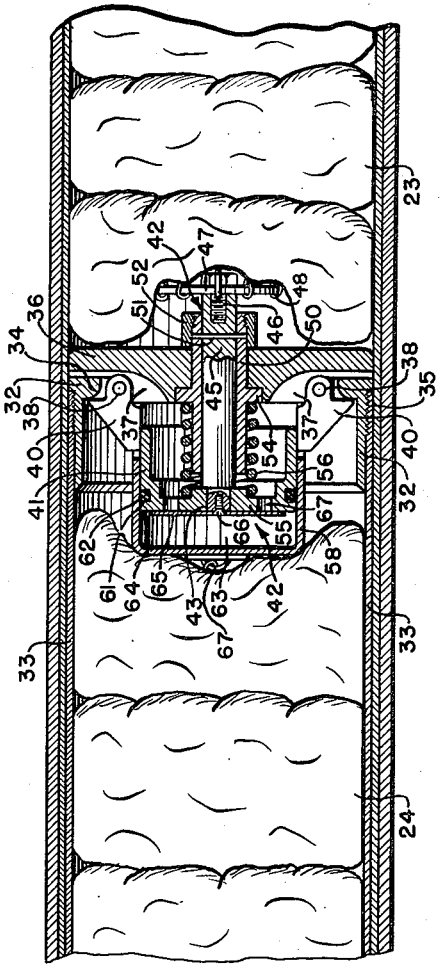
*INVENTORS*
A. E. ROBERTSON
W. J. DONAHUE
L. R. BUTLER
BY
ATTYS.

June 12, 1962  A. E. ROBERTSON ET AL  3,038,407
DRAG OPERATED PARACHUTE RELEASE MECHANISM
Filed July 2, 1951  2 Sheets-Sheet 2
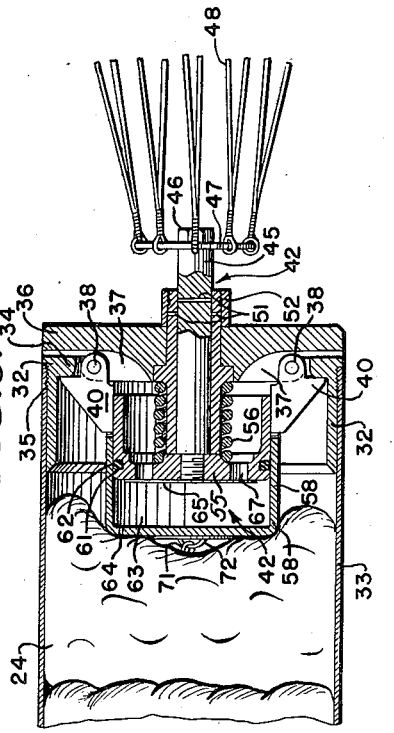
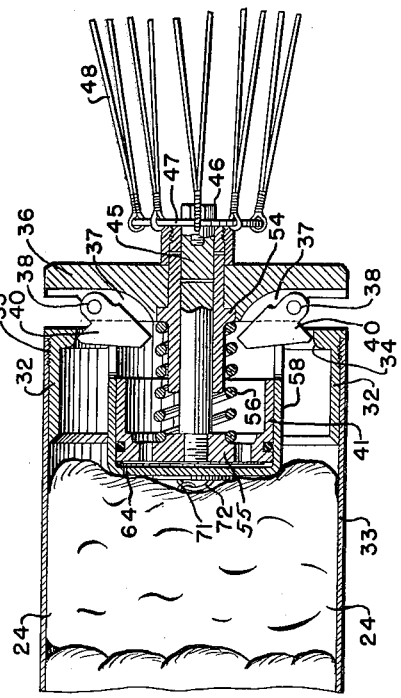
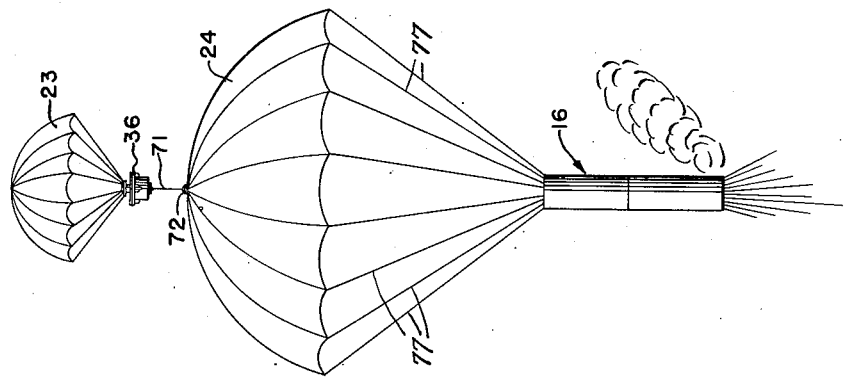
INVENTORS
A. E. ROBERTSON
W. J. DONAHUE
L. R. BUTLER
BY
ATTYS.

United States Patent Office 3,038,407
Patented June 12, 1962

3,038,407
DRAG OPERATED PARACHUTE RELEASE MECHANISM
Anthony E. Robertson, Silver Spring, and William J. Donahue, 718 Kennebec Ave., Takoma Park, Md., and Louis R. Butler, 2506 N St. SE., Washington, D.C.
Filed July 2, 1951, Ser. No. 234,896
10 Claims. (Cl. 102—34.1)
(Granted under Title 35, U.S. Code (1952), sec. 266)

This invention relates generally to rocket flares and more particularly to a parachute release device therefor wherein is provided an improved arrangement for releasing a main parachute from a rocket launched flare in response to a predetermined drag upon a pilot parachute connected to the main parachute through the release device.

Heretofore, the releasing of parachutes from high velocity objects such as a rocket launched flare or the like, has offered considerable difficulty. This has been largely due to damage resulting to the parachute from shock opening upon being released from a flare traveling at a velocity too near the velocity at which the flare is expelled from the launching rocket.

One of the methods heretofore most commonly practiced for delaying the opening of a parachute released from a high velocity object, makes provision for maintaining the parachute in a collapsed condition by a centerline, or the like, until such time as a pyrotechnic element, ignited at the time of launching of the missile, is operated to separate the wire and thusly to release the parachute for extending to open position.

A further prior method is to maintain the main or supporting parachute for the flare initially encased within a two section canister until a timing mechanism, such as a clock, has operated to separate the canister to allow the parachute to open. The parachute opening thus occurs at a fixed time following the launching of the flare and is determined by the initial setting of the mechanism of the clock.

Of the numerous prior art parachute release devices tested, the one most successful in accomplishing the results attainable by the instant device, includes an arrangement for releasing a pilot parachute of a relatively small diameter prior to the release of a larger or main parachute. This is accomplished by the burning of a pyrotechnic element which is ignitable as the pilot parachute is released and serves to release the main parachute after a lapse of time controlled by the composition of the element.

It was found however, after extensive tests, that identical objects launched in a similar manner from similar missiles will, after a given time, be moving at entirely different velocities by reason of uncontrollable factors unpredictable at the time of construction, assembly or launching of the object in question. Such factors may be attributed to varying wind conditions or to some extent to the trajectory of the launching missile or varying characteristics in the propelling charge by which the missile was expelled from the launching missile. Consequently, as the result of such tests, the use of fixed time delay means for releasing a parachute from a fast moving object such as a rocket launched flare has not been found to be entirely satisfactory.

The device of the present invention possesses all of the advantages, while obviating the disadvantages, of the foregoing apparatus by providing a parachute release device wherein the releasing of the main parachute is controlled entirely by the drag upon a pilot parachute released upon the launching of the flare from the carrier rocket and operation of the release device therefore is independent of the time required for the velocity of the flare to reach a condition desired for the releasing of the main parachute.

The present invention further provides for a dashpot arrangement for damping the operation of the release device to release position whereby there is provided a delaying interval suitable for preventing spurious operation of the device during the time required for the pilot parachute and flare attached thereto to attain stability in the air immediately following release thereof from the rocket and before the release device is permitted to be actuated in response to the drag thereupon to the main parachute releasing position.

An object of the present invention is to provide a new and improved device for releasing, from a rocket launched flare, a parachute as the velocity of the flare decreases to a predetermined value.

A further object is to provide a new and improved parachute release device wherein the drag upon a pilot parachute controls the releasing of a main parachute.

A still further object is to provide in a signal flare expellable from a rocket in flight, a new and improved release device responsive to the drag upon a pilot parachute and releasable at the time of expulsion of the flare from the rocket, to release a main and supporting parachute from the flare as the drag upon the pilot parachute reaches a predetermined decreased value.

A further object is to provide in a parachute release for a signal flare adapted for launching from a rocket in flight, an arrangement for damping movement of the release to main parachute releasing position until the flare and pilot parachute attached thereto have become sufficiently stable within the air following the release of the flare from the rocket.

Other objects and many attendant advantages of this invention will be readily appreciated as the same becomes better understood by reference to the following detailed description and considered in connection with the accompanying drawings wherein:

FIG. 1 is a view of a naval rocket partially cut away and showing the arrangement therein in section of a signal flare assembly, and in elevation, the parachute release device of the present invention;

FIG. 2 is a sectional view cut away of the rocket casing showing in section the parachute release of the present invention as in its initial or locked position;

FIG. 3 is a sectional view partially cut away through the flare casing and showing in section the parachute release mechanism in its first operated position;

FIG. 4 is a sectional view partially cut away through the flare casing and showing in section the parachute release mechanism in its second operated and parachute releasing position; and FIG. 5 is a view in elevation of the ignited flare as lowered by the released parachutes.

Referring now to the drawings and with more particularity to FIG. 1 thereof, the signal rocket generally designated 5 and of a type commonly used in naval warfare, is shown therein to include a cylindrical casing 6 of which one end thereof is closed as by a hollow cap piece 7. There is provided about the cap an annular groove 8 by which the cap is secured within the end of the casing as by a rolled edge 9 formed on the latter.

Secured, preferably as by press fitting, within the opposite end of the casing 6 is a rocket motor generally designated 10 and including a rocket housing 12 wherein is disposed the rocket propelling charge 13. Diametrically arranged fins 14 preferably butt welded as at 15 to the rocket housing 12, provide suitable means for stabilizing the rocket during its flight through the air after the ignition of the charge 13.

Telescopically received within the rocket casing 6 is a signal flare assembly generally designated 16 and adapted, when ignited and discharged from the rocket in flight as will hereinafter be more fully described, to produce a high intensity light suitable for illuminating a large area of the ground or water, as the case may be, as the flare is gradually lowered by parachute following its release from the rocket.

Arranged in the casing and in abutment to the rocket motor 10 is a recessed block 17 wherein is preferably packed a suitable quantity of propelling charge 18. Upon the completion of the burning of the rocket charge 13, and which generally occurs after the rocket has reached a position high in the air, a powder train 19, disposed within a bore provided therefor at the base of the charge, is ignited thereby to in turn ignite a delay pellet 20 arranged in the base of the block member 17 whereupon, after a predetermined interval of time, as determined by the composition of the pellet 20, the charge 18 is ignited to expel from the end of the casing the flare assembly 16.

There is provided, as means for dislodging the cap piece 7 from the end of the casing as the flare is expelled therefrom, a split receptacle 22 so arranged and formed as to be driven against the base of the cap by a plate piece 21 upon the burning of the charge 18 and whereby is forced outwardly from the end of the casing the plate, receptacle and flare during the launching operation thereof. As the flare and receptacle clear the rocket casing 6 the receptacle 22 separates into segments, not shown, to move free of the flare leaving a now exposed pilot parachute 23 free to open for producing a drag upon the flare sufficient to rapidly reduce the speed of the latter to a value considered safe for the opening of a main or supporting parachute 24.

Concurrently with the launching of the flare from the rocket 5 by the burning of the charge 18, jets of flame are directed from the charge through bores 25 provided in the plate 21 for igniting a fast burning increment 27 whereby the burning composition 28 of the flare is thusly ignited as the flare moves outwardly from the end of the rocket casing 6.

At the high velocity at which the flare is expelled from the rocket it may be readily understood how damage could result to the main parachute were the latter allowed to open at this time. Further there is present the possibility, as hereinbefore described, of the shock opening of the parachute dislodging the flare composition 28 generally secured, only as by packing, within the opened end of the flare casing 29.

To forego the above occurring, there is provided between the pilot parachute and the main parachute a drag responsive release device generally designated 30 and adapted, responsive to a predetermined drag upon the pilot parachute, to release the main or supporting parachute 24 from a receptacle 33 therefor only after this drag has lessened to a predetermined safe value.

The drag release mechanism 30, FIG. 2, is comprised of an annular locking ring 32 formed preferably for threading, as at 35, within the end of the receptacle 33 and having thereon an inwardly directed flange section 34. Receivable within this flange is an annular chassis member 36 whereupon is provided pairs of radially arranged flanges 37 wherebetween are hinged, as by pins 38, a plurality of locking lugs or dogs 40. The chassis 36 is preferably diecast from one of the lighter metals such as magnesium or aluminum whereby, when supported from the pilot parachute 23, FIG. 5, following the operation of the device, the load upon the smaller or pilot parachute is thusly lessened.

The radial arrangement of the dogs 40 is such as to be spread into locking engagement with the flange 34 for securing the chassis to the ring and thus to the casing 36 by movement between the dogs of a locking flange 41 forming a part of a piston assembly 42. The piston head 55 is provided with a centrally arranged opening 43 wherein is secured, as by brazing, soldering or the like, a piston shaft 45. Initially, this shaft is secured against movement within a flanged tubular guide 50 therefor as by a shear pin 51, the tube and shaft, thusly so assembled, being clamped as by a ring nut 52 in cooperation with the guide flange 54, within a centrally disposed opening provided therefor in the chassis member 36. The nut 52, in addition to clamping the guide tube 50 to the chassis, further provides the function of securing the pin 51 against movement transversely of its locking position within the shaft and guide.

Secured to the end of the shaft section 45 as by a shoulder screw and swivel ring 46 and 47 respectively are the shroud lines 48 of the pilot parachute 23. By such an arrangement the shroud lines are prevented from tangling as the flare is launched from the rocket and as the pilot parachute therefor extends to flared position.

Upon the shock opening of the pilot parachute, immediately following the release of the flare from the rocket, sufficient shock force is applied by the pilot parachute to the piston shaft 45 to cause a shearing of the pin 51 whereupon the shaft is thusly freed for axial movement within the guide 50. The initial drag upon the shaft 45 by the pilot parachute at this time is generally sufficient to maintain for a short period of time the piston head 55 in resting position against the end of the guide tube 50, FIG. 3, and thusly to further compress an initially loaded spring 56 interposed at assembly between the piston cap 55 and the extended flange 54 on the guide.

As the drag upon the pilot parachute lessens, following a decrease in velocity of the flare 16 and pilot parachute 23, the force exerted by the spring 56 upon the piston 42 is sufficient to overcome the drag applied thereto by the pilot parachute 23 whereby the piston cap 55 is urged by the spring outwardly from the chassis and into a cup-shaped cover piece 58 arranged over the piston and about the dogs and flanges 40 and 37 respectively, FIG. 1, to be secured as by screws 60 to a cylindrical flange, not shown, provided about the chassis member 36.

By the provision within a groove 61 of an O-ring gasket 62 between the piston and cup-shaped member 42 and 58 respectively, a pressure sealed connection is maintained therebetween whereby air trapped, as at 63, between the member and piston is compressed as the piston is caused to move thereagainst during the subsequent operation of the device. By such an arrangement, there is provided a dashpot suitable for damping movement of the piston toward dog releasing position at a rate predetermined and controlled by the selection of a bleeder port 64 adapted and arranged for discharging from the chamber 63 the trapped air at a predetermined rate. The purpose of this dashpot arrangement is to retard movement of the piston toward dog releasing position at a rate substantially equal to the normal lessening in drag applied by the pilot parachute 23 as the velocity of the flare decreases. In this manner sporadic or erratic movement of the flare or pilot parachute immediately following the release of the flare from the rocket is thusly prevented from effecting a premature releasing of the mechanism and accordingly the main parachute attached thereto until the flare and pilot parachute have become stable in flight and the velocity of the flare has decreased to a desired value.

After the flight of the flare and pilot parachute becomes stable in the air and the drag upon the pilot parachute lessens as the velocity of the flare decreases, the piston 42 gradually moves, under the urge of the spring 56, to a position within the cup-shaped member 58 for clearing the respective outer edges or extremity portions of the dogs 40, FIG. 4. The dogs are thusly freed to swing about their respective pins 38 thereby to disengage themselves of the ring flange 34 whereupon the chassis assembly is then withdrawn from the end of the flare casing 33 by the pilot parachute 23. The chassis and assembly thereon, when so released, serve to draw forth from the flare casing the main parachute 24 secured as by a pull cord and ring 71 and 72 respectively to the dashpot cap piece 58. The releasing of the main parachute in this manner is accomplished independently of the predetermined safe value and is controlled entirely by the drag upon the pilot parachute which, in turn, is proportional to the velocity thereof.

Upon the release of the main parachute 24 in the foregoing manner, the flare 16 is supported therefrom by the shroud lines 77 of the main parachute connecting with a swivel ring 74, FIG. 1, centrally secured for free rotation about a shoulder rivet assembly 75 fastened conventionally to a partition 76 separating the flare composition 28 from the parachute receptacle 33.

There is provided within the piston head 55 a plurality of orifices 67 over which is secured as by a centrally disposed screw 66 a flexible valve plate 65 which, during movement of the piston into compression of the spring 56 during the initial shock opening of the pilot parachute 23, lifts from the ports 67 for allowing air to flow beneath the plate 65 and into the chamber 63. By means of such a valve arrangement, the volume of the air capable of being trapped within the dashpot is thusly increased.

Obviously many modifications and variations of the present invention are possible in the light of the above teachings. It is therefore to be understood that within the scope of the appending claims the invention may be practiced otherwise than as specifically described.

The invention described herein may be manufactured and used by or for the Government of the United States of America for governmental purposes without the payment of any royalty thereon or therefor.

What is claimed as new and desired to be secured by Letters Patent of the United States is:

1. A signal flare of the character disclosed adapted for launching from a rocket in flight including, in combination, a casing, a flare composition arranged in one end of said casing and ignitable upon launching of said flare from said rocket, a main parachute arranged in the other end of said casing, a pilot parachute arranged within said other end of the casing means including a plurality of pivotally mounted locking elements carried by said pilot parachute in locking engagement with said casing for preventing withdrawal of said main parachute until said elements are released, means including a dashpot connected to said pilot parachute for releasing said elements from said casing as the drag upon the pilot parachute decreases to a predetermined value, and means connected to said main parachute and said dashpot for withdrawing the main parachute and the dashpot from said casing when said elements are released therefrom.

2. A signal flare of the character disclosed adapted for launching from a rocket in flight including, in combination, an elongated tubular casing, an ignitable flare composition arranged in one end of said casing, a member releasably locked to the other end of the casing for closing the end thereof, means including a plurality of pivotally mounted dogs carried by said member in locking engagement with said casing for releasing said member as said dogs are actuated to a release position, a main parachute enclosed in said other end of said casing and operatively connected to said member, a pilot parachute releasable upon launching of said flare from said rocket, means including a dashpot carried by said member and connected to said pilot parachute and responsive to the drag of said pilot parachute for actuating said dogs to a release position whereby the main parachute is withdrawn from the casing when the drag force upon the pilot parachute decreases to a predetermined value, and means carried by said dashpot interconnecting said main parachute and said pilot parachute for withdrawing the main parachute therefrom when the member is released.

3. A signal flare of the character disclosed adapted for launching from a rocket in flight including, in combination, an elongated cylindrical casing, a flare composition ignitable upon the launching of said flare from said rocket and arranged in one end of said casing, a release mechanism disposed in the other end of said casing and releasably secured thereto, a main parachute enclosed by said casing and operatively connected to said release mechanism, a pilot parachute releasable upon launching of said flare from said rocket and operatively connected to said release mechanism, means carried by said release mechanism and responsive to a predetermined initial drag on the pilot parachute at the time of release thereof and movable by said initial drag from an initial position to a first position, means arranged within said release mechanism and responsive to a predetermined lessening in drag upon said pilot parachute for actuating the movable means from said first position to a release position, and a plurality of locking elements carried by said release mechanism for releasing the release mechanism from said casing as said movable means is moved to said release position whereby the main parachute and the release mechanism connected thereto are withdrawn from the casing by the drag on the pilot parachute.

4. A rocket flare of the character disclosed comprising, in combination, a rocket casing, a rocket motor including a propelling charge arranged in one end of said casing for propelling said casing at high velocity into the air, a plurality of stabilizing fins arranged about and fixedly secured to said casing for maintaining the casing in an oriented position in flight, a receptacle removably arranged in said casing and having therein a partition for dividing the receptacle into two sections, an inflammable flare composition arranged in one of said sections, a main parachute arranged in the other of said sections, a charge interposed between said receptacle and said rocket motor and ignitable by the burning of said rocket charge to expel the receptacle from the end of said casing, a pilot parachute disposed within said other section and releasable from said receptacle upon the discharge of the receptacle from said casing, a parachute release assembly including a plurality of pivotally mounted dogs releasably secured to the receptacle for maintaining said main parachute in said other section until said dogs are released, means including a dashpot connected to said pilot parachute and responsive to the air drag upon the said pilot parachute for releasing said dogs from the receptacle when the drag upon the pilot parachute has decreased to a predetermined value, and means interconnecting said main parachute and dashpot for withdrawing said main parachute from said other section in response to said drag on the pilot parachute as the dogs are released.

5. A rocket flare of the character disclosed including, in combination, a rocket casing, a rocket motor including a rocket charge secured for propelling said casing into the air upon the burning of said charge, a receptacle telescopically received in said casing, an inflammable flare composition arranged in one end of said receptacle, a main parachute disposed in the other end of said receptacle, time delay means ignitable by said charge and adapted after a predetermined interval following the burning of said charge for expelling the receptacle from said casing, a pilot parachute releasable from said receptacle upon the discharge thereof from said casing, a parachute release assembly releasably secured within said receptacle and interconnected between said pilot parachute and said main parachute, a plurality of locking elements carried by said release assembly for releasably locking said assembly to said receptacle, and means including a movable element arranged within said assembly and connected to said pilot parachute for releasing the locking elements from the receptacle when the drag upon the pilot parachute has decreased to a predetermined value.

6. A rocket flare of the character disclosed including, in combination, a rocket casing, a rocket motor including a rocket charge secured for propelling said casing into the air upon the burning of said rocket charge, a receptacle telescopically received in said casing, an inflammable flare composition arranged in one end of said receptacle, a main parachute disposed in the other end of said receptacle, a second charge, delay means ignitable from said rocket charge and adapted after a predetermined interval following the burning of the rocket charge to ignite said second charge to expel said receptacle from the casing, a pilot parachute disposed within said receptacle and releasable therefrom upon the discharge of the receptacle from the casing, a ring arranged in said receptacle and secured therewithin, a plate disposed within said ring, a plurality of dogs arranged about said plate and movable into locking arrangement with said ring for releasably securing said plate in closing relation with respect to said receptacle, means carried by said plate and connected to said pilot parachute and responsive to the drag of the pilot parachute to release said dogs from said ring as the drag upon said pilot parachute decreases to a predetermined value, and means operatively connecting said main parachute to said plate whereby upon the release of said plate from said ring the main parachute is drawn free of said receptacle by the drag on the pilot parachute.

7. In a signal flare of the character disclosed, the combination of a flare casing, a parachute release assembly disposed within said casing, a ring arranged in one end of said flare casing and secured thereto, a chassis member closing said casing adjacent said ring, a plurality of dogs pivotally secured to said chassis, a piston movable between said dogs for spreading said dogs into locking engagement with said ring, a shear pin securing said piston in an initial position to said chassis, a pilot parachute connected to said piston and expellable from said casing when the flare is launched, said pin being sheared in response to the initial drag on said pilot parachute, said piston being moved to a first position when the pin is sheared, spring means interposed between said piston and said chassis for movement of said piston to a second position responsive to a predetermined lessening in drag upon said pilot parachute, said dogs being disengaged from said ring when the piston moves to said second position thereby to release said chassis from said casing, a main parachute disposed within said casing, and means connecting said main parachute to said chassis for withdrawing the main parachute from the casing by the drag on the pilot parachute when the chassis is released.

8. In a signal flare adapted for launching from a rocket in flight, the combination of a cylindrical casing, a flare composition arranged in one end of said casing, a parachute receptacle formed in the other end of said casing and having an opening adjacent one end thereof, a partition separating said flare composition from said receptacle, a swivel ring, a main parachute disposed in said parachute receptacle and secured by said swivel ring to said partition, a sleeve ring arranged in said opening, a closure for said opening and including an annular chassis, a piston centrally disposed for movement in said chassis, a plurality of dogs hingedly secured to said chassis and operable by said piston into locking engagement with said ring for releasably securing said chassis in closing relation within said opening, a pilot parachute operatively connected to said piston and releasable upon movement of said flare from said rocket to produce a predetermined drag upon said piston to move the same from an initial position to a first position, spring means interposed between said piston and said chassis and responsive to a predetermined lessening in drag upon said pilot parachute to move said piston from said first position to a second position for releasing said dogs whereby said chassis may be withdrawn from said opening, a dashpot including said piston for preventing movement thereof from said first position to said second position except at a predetermined rate, and means responsive to said withdrawing of said chassis from said opening for withdrawing the main parachute from said receptacle.

9. An apparatus of the character disclosed, the combination of a casing, a flare disposed in one end of said casing, a main parachute disposed within the other end of said casing, said main parachute having shroud lines secured to said flare, a ring member secured to said other end of the casing, a second casing having the first casing telescopically received therewithin and separable therefrom when the casings are expelled from a rocket support therefor, a pilot parachute disposed within said second casing and dischargeable therefrom when said casings are separated, a circular plate member slidably disposed within said second casing and disposed adjacent said ring member, a cup-shaped member secured to the crown of the main parachute and carried by said plate member coaxially therewith, a piston slidably disposed within said cup-shaped member, said piston and cup-shaped member comprising a dashpot having a predetermined damping action, an elongated sleeve carried by said plate member coaxially therewith, a piston rod secured at one end thereof to said piston and slidably supported within said sleeve, a shear pin for locking said piston rod initially to said sleeve with the piston partially withdrawn from said cup-shaped member, a coil spring sleeved about said piston rod and interposed under compression between said piston and plate member, a plurality of dogs carried pivotally on said plate member, each of said dogs having an extremity portion in engagement with said piston and a latch portion in engagement with said ring whereby the plate member is locked to the ring by said dogs, and means for securing said pilot parachute to the other end of the piston rod whereby said shear pin is sheared in response to the initial drag on the pilot parachute upon said discharge thereof from the second casing and said piston is moved under force of said spring to a dog freeing position when the drag on the pilot parachute has decreased to a predetermined value, said dashpot preventing spurious movement of the piston during the time required to stabilize the flight of the first casing under drag of the pilot parachute thereon, said main parachute being withdrawn from the first casing by the pilot parachute when the plate member is released from said ring.

10. Apparatus according to claim 9 further characterized by valve means carried on the said piston for admitting air into said dashpot between the piston and the base of said cup-shaped member when the piston and piston shaft are moved to shear said pin.

References Cited in the file of this patent

UNITED STATES PATENTS

| | | |
|---|---|---|
| 1,305,186 | Bergman | May 27, 1919 |
| 1,827,580 | Hoehn et al. | Oct. 13, 1931 |
| 2,478,758 | Frieder et al. | Aug. 9, 1949 |
| 2,503,269 | Hickman et al. | Apr. 11, 1950 |